United States Patent [19]

Hewitt

[11] Patent Number: 5,784,877
[45] Date of Patent: Jul. 28, 1998

[54] ROCKET-RAMJET ENGINE CASING PORT CLOSURE

[75] Inventor: Patrick W. Hewitt, Warrenton, Va.

[73] Assignee: Atlantic Research Corporation, Vienna, Va.

[21] Appl. No.: 745,641

[22] Filed: Nov. 8, 1996

[51] Int. Cl.[6] ............................................. F02K 7/18
[52] U.S. Cl. ........................... 60/204; 60/245; 137/15.1
[58] Field of Search ........................... 60/204, 224, 225, 60/245, 251, 270.1; 137/15.1, 15.2

[56] References Cited

U.S. PATENT DOCUMENTS

| | | |
|---|---|---|
| 3,768,255 | 10/1973 | Barnes, Jr. et al. . |
| 4,050,243 | 9/1977 | Holzman et al. . |
| 4,063,415 | 12/1977 | Rhoades . |
| 4,391,094 | 7/1983 | Engel et al. ............................. 60/245 |
| 4,441,312 | 4/1984 | Smith . |
| 4,450,679 | 5/1984 | Hähnel . |
| 4,651,523 | 3/1987 | Adams . |
| 4,841,724 | 6/1989 | Hall et al. . |
| 5,347,807 | 9/1994 | Brossier et al. . |

FOREIGN PATENT DOCUMENTS

| | | | |
|---|---|---|---|
| 5-288119 | 11/1993 | Japan ........................................ 60/245 |
| 2068090 | 7/1981 | United Kingdom ...................... 60/245 |

*Primary Examiner*—Louis J. Casaregola
*Attorney, Agent, or Firm*—Lowe, Price, LeBlanc & Becker

[57] ABSTRACT

The present invention discloses a composite material closure as a port cover for a rocket-ramjet engine and a method of transitioning between rocket booster operation and ramjet operation. The composite material closure is made to be coextensive with an insulating lining of the casing of the rocket-ramjet engine. Pyrotechnic charge devices are associated with the composite material closure and ignited to cut there-through and form an opening in the closure for air flow during ramjet operation.

21 Claims, 1 Drawing Sheet

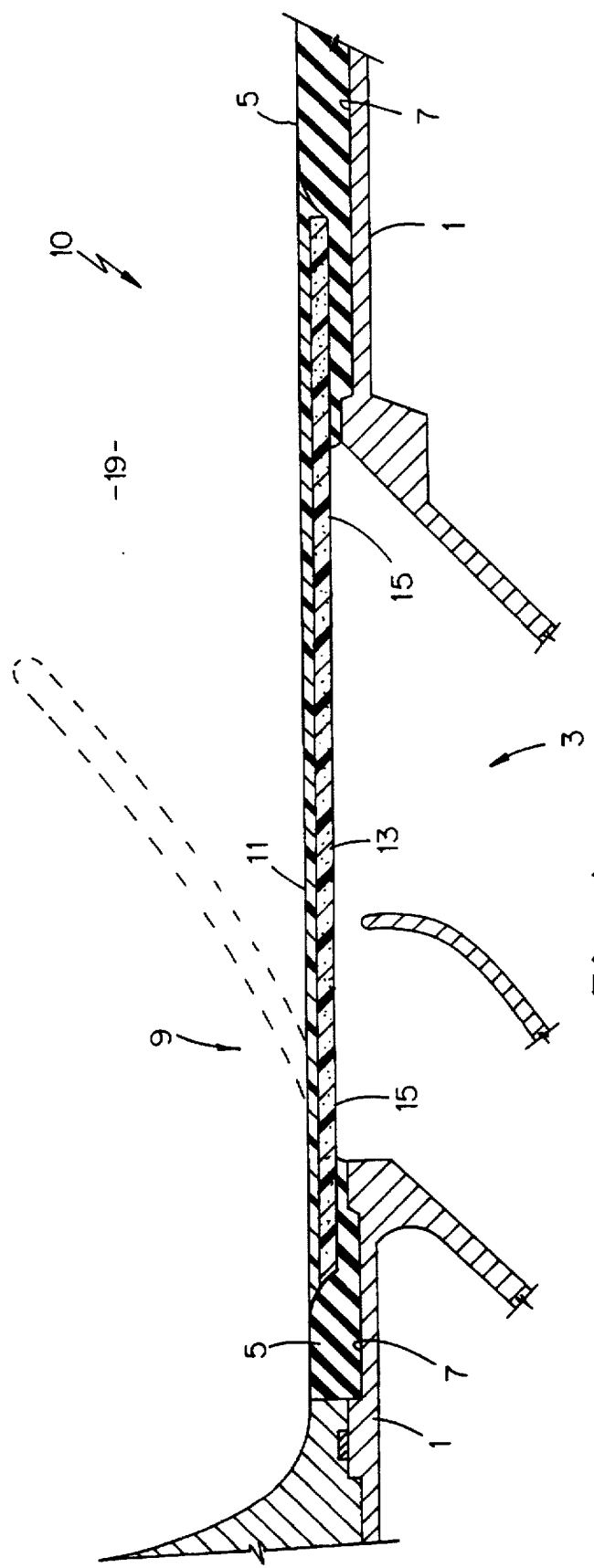
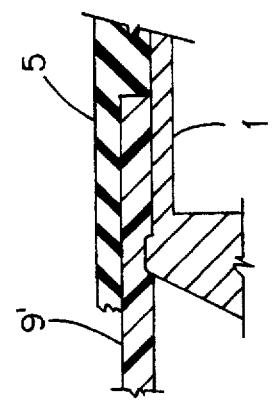

ROCKET-RAMJET ENGINE CASING PORT CLOSURE

FIELD OF THE INVENTION

The present invention is directed to a rocket-ramjet engine casing port closure and, in particular, to a port closure made of a composite material which is removed for ramjet operation by a pyrotechnic event.

BACKGROUND ART

In the prior art, various types of port covers or closures have been proposed to permit a rocket or jet engine to transition from rocket operation to ramjet operation.

In U.S. Pat. No. 4,441,312 to Smith, air inlets for the ramjet phase of operation have covers which are used during rocket boost to seal the air inlets so that proper operation of the rocket can be accomplished. Once the rocket boost is complete, the covers are released to allow air into the inlets and to initiate ramjet operation.

U.S. Pat. No. 3,768,255 to Barnes, Jr. et al. discloses an ejectable ram air inlet port cover which comprises a plurality of segments arranged in close fitting side-by-side relation. The segments are self ejecting in that they are adjacent solid fuel in the booster, the solid fuel maintaining the segments in a port sealing relation until combustion of the solid fuel.

U.S. Pat. No. 4,651,523 to Adam discloses an integral rocket and ramjet engine comprising, in flow series, an intake duct for aerodynamically compressing air, a port cover, a combustion chamber and a propelling nozzle. The port is moveable axially from a first position when it prevents air from entering the combustion chamber to a second position when the rocket charge is spent. Movement of the port cover to the second position allows compressed air into the combustion chamber for ramjet operation.

In yet another prior art design, a variable flow duct rocket utilizes a dual propulsion system. In this type of a rocket, the combustor which provides the ramjet operation also houses the solid rocket motor. Since the solid rocket motor provides the initial boost phase for rocket operation prior to ramjet operation, the combustor must sustain relatively high internal loads during rocket mode or firing. The port covers for the inlet ducts which apply air to the combustor must have substantial structural integrity, particularly since the rocket motor may operate at a pressure of about 1300 psi. These types of port covers incorporate a floating I-beam design approach and are hinged into the combustor since they must be retained following the end of the boost phase of rocket operation. Eventually, the opened port covers are consumed during the air breathing combustor operation.

Given the complex mechanical designs related to prior art port covers and the consumption of port covers in variable flow duct rockets, a need has developed to provide an improved port cover or closure design.

In response to that need, the present invention provides an improved rocket ramjet engine casing port closure design which overcomes the disadvantages noted above in prior art designs.

SUMMARY OF THE INVENTION

Accordingly, it is a first object of the present invention to provide an improved rocket-ramjet engine casing port closure.

A further object of the present invention is to provide a rocket ramjet engine casing port closure which can withstand the pressures developed during the rocket booster operation.

A still further object of the present invention is to provide a rocket ramjet casing port closure which is simple in design, low in cost, low in weight and without any adverse effect on inlet airflow.

Another object of the present invention is to provide a method of transitioning from rocket operation to ramjet operation using the inventive port closure.

Other objects and advantages of the present invention will become apparent as a description thereof proceeds.

In satisfaction of the foregoing objects and advantages, the present invention provides an improvement in rocket-ramjet engine casings having at least one port opening for ramjet engine operation and an insulating lining covering an interior surface of the casing. The invention comprises providing a composite material, preferably a matrix material with a reinforcing filler material therewith, which is coextensive with the insulating lining to seal the port opening during rocket engine operation. At least one pyrotechnic charge device is provided in combination with the composite material and is affixed thereto. The pyrotechnic charge device separates at least a portion of the composite material closure from the insulating lining and casing to allow air to flow through the port opening for ramjet operation.

The composite material closure can be in the form of a cylindrical sleeve to seal a plurality of port openings or can be one or more individual segments, each segment sealing a select port opening.

The composite material can be bonded to the insulating lining, the casing or a combination of both. Bonding can be achieved by adhesive means or during casting of the insulating lining onto the casing.

The pyrotechnic charge device to be used with the composite material closure can be any known pyrotechnic charge device which would form an opening in the composite material closure. The pyrotechnic charge device can be, for example, linear shaped charges formed in a rectangular shape or three sided so that the charges cut through the composite material closure to form a hinge. Other charge devices can include sheet explosives, detonating cores or the like.

The composite material of the closure can be any known composite material which will provide sufficient strength to withstand the rocket operation while still being able to be coextensive with the casing lining. For example, a graphite/epoxy composite could be used, the graphite fibers being in the form of hoop wraps, helical wraps, braids or the like. The composite material can also be in the form of a laminate wherein the composite material would be used in conjunction with a reinforced EPDM or other material.

The present invention also provides a method of transitioning from rocket operation to ramjet operation using the inventive closure. According to the inventive method, a rocket ramjet engine having a casing with at least one port opening for ramjet operation and an insulating lining in the casing is provided. A composite material closure is provided coextensive with the lining to seal the opening. A pyrotechnic charge is detonated to form an opening in the composite material closure so that air can flow through the opening for ramjet operation.

BRIEF DESCRIPTION OF THE DRAWINGS

Reference is now made to the drawings of the invention wherein:

FIG. 1 is a cross-sectional view of the inventive composite material closure in combination with a rocket-ramjet engine casing; and FIG. 2 is a partial sectional view of an alternative embodiment of the FIG. 1 closure.

DESCRIPTION OF THE PREFERRED EMBODIMENT

The composite material closure of the instant invention provides significant advantages over prior art port covers used for rocket-ramjet engines. The prior art systems, particularly four-sided engine port covers, are mechanically complex and present design difficulties upon integration into the system. By embedding a composite material in the existing insulation of a rocket-ramjet engine casing, a simple and low cost port opening seal is provided which is low in weight and also reduces the overall casing weight by relieving extensive port opening structure modifications required for prior art closures. The composite material closure does not or at most minimally interfaces with the propellant grain or case, has no effect on inlet airflow, is reliable and has nearly instantaneous opening time by reason of the pyrotechnic charge devices used to form the port opening.

The composite material, by reason of its reinforcement filler, is of sufficient strength to contain the pressure within the engine casing during the rocket booster operation. In addition, an opening can be formed in the composite material by a pyrotechnic charge device without the shock induced by the charge adversely affecting the electronics associated with the rocket-ramjet engine.

Referring now to FIG. 1, the inventive composite material closure is generally designated by reference 10 and is seen to include a rocket-ramjet casing 1 having a port opening 3 therein. The casing 1 has an insulating lining 5 along an inner surface 7 thereof. The insulating lining 5 can be any type known in the art, for example, a silicone elastomer such as Dow Corning 93-104 or a phenolic resin with silica fibers such as Phenolic Refrasil sold by the Chemical Insulating Company Co., Ltd.

The composite material closure is designated by the reference number 9 and includes a laminate construction comprising layers 11 and 13 and a linear shaped pyrotechnic charge device identified by reference number 15. Although a laminate construction is shown in FIG. 1, the composite material closure may also comprise a single layer 9' as shown in FIG. 2 or three or four layers if strength requirements dictates such.

The composite material closure 9 is shown in FIG. 1 to be coextensive with the lining 5. The term "coextensive" is intended to mean that the composite material closure 9 is generally aligned with the lining so as to form a seal across the port opening 3. The thickness of the composite material closure 9 should approximate that of the lining or be less than the lining thickness.

The linear shaped charge 15 shown in FIG. 1 is exemplary as a pyrotechnic charge device to form an opening in the composite material closure 9. For example, linear shaped charges could be adhered to the composite material closure 9 in the form of a u-shape so that, when the charges are detonated, a u-shaped slot is formed in the composite material closure 9 so that a hinge configuration as depicted in cross-hatch in FIG. 1 is achieved. With linear shaped charges of this configuration, the hinged composite material closure 9 bends into the interior 19 of the casing 1 to permit air into the port opening 3 for ramjet operation.

Of course, other types of pyrotechnic charge devices and configurations can be utilized to form the opening in the composite material closure 9. For example, the linear shaped charges could be affixed to the composite material closure in the form of a rectangle or square so that an entire segment of the composite material closure is separated by charge detonation from a remaining portion still affixed to the casing and/or insulating lining. Other types of pyrotechnic charge devices could also be utilized such as sheet explosives, detonation cores and additional devices to assure that the corners of a given section of the composite material are cut by charge detonation so that a proper opening is formed in the composite material closure.

The pyrotechnic charge device 15 can be secured to the composite material closure 9 in a conventional fashion, for example, adhesives or the like. Although any known explosive compositions can be used to cut through the composite material closure, preferred explosive charges include cyclotetramethylentetranitramine (HMX) and cyclotrimethylenetrinitramine (RDX). These explosive materials can be used as part of insensitive high explosives (IHE) such as a PBXN type. These typically comprise a curable elastomer binder in which particles of high-energy material, particularly explosive particles, oxidizers, and reactive metals, are dispersed throughout the binder. The isomeric binder has generally been a cured elastomer, including hydroxyterminated polybutadienes, polypropylene glycols and the like. Thermoplastic resin binders can also be used. The explosive material should be configured in shape and amount to cut through the composite material. For example, a ratio of 95% HMX and 5% viton (a binder) in a loading of up to 35 grams per foot of charge are exemplary loadings. Other loadings may be required depending on the composition of the explosive material utilized. Viton is a fluoroelastomer based on the copolymer of vinylidene fluoride and hexafluoropropylene. The viton material acts as the binder for the explosive HMX.

Referring again to FIGS. 1 and 2, the composite material closure can be made coextensive with the lining material 5 using any number of bonding or attaching procedures. The closure could be bonded to the lining using a known adhesive. Alternatively, the closure could be secured or bonded to the lining during casting of the lining onto the shell surface 7 as is also well known in the art.

Referring to FIG. 2, the composite material closure 9' could also be bonded to both the casing 1 and the lining 5 or, alternatively, bonded to the casing 1 with the lining 5 installed therearound after composite material closure 9' attachment.

The composite material closure is preferably a matrix material having a reinforcing filler therein. The reinforcing filler can be either fibers, whiskers, particles, flakes, strands, braided sleeves, weaves or any other configuration known in the art typically used as a reinforcing medium for composite materials. When using a strand type material, the strands could be oriented in either a helical or hoop type direction with respect to the cylindrical casing 1. More particularly, one composite layer 11 could utilize a hoop wrap of reinforcing strand with the other composite 13 utilizing a helical wrap.

Alternatively, the layer 13 could be an elastomer type material such as an EPDM rubber or the like with or without a reinforcing filler therein. The EPDM rubber layer could include reinforcing tubes circumferentially aligned with the cylindrical casing 1 in order to allow a degree of expansion and help relieve stresses in the metal case. If desired, the composite material closure could be manufactured with an EPDM rubber portion which would be located in the area of the hinge to facilitate the hinge movement when forming the opening in the closure.

The materials of the composite material matrix and reinforcement filler can also vary depending on the particular application. Reinforcing fillers adaptable for the inventive composite material closure include glass fibers, carbonaceous fiber such as graphite, polymer fibers such as kevlar, inorganic fibers and metal filaments. A preferred reinforcement filler would include graphite fibers. Examples of other reinforcing materials include boron, silicon carbide, silica, alumina, aramide fibers, or the like.

Matrices can be any type which can be processed so as to embed and adherently grip the reinforcing fillers. Typical matrices include epoxy resins, silicones, phenolics, or other high temperature thermosetting systems. Thermoplastic resin systems could also be utilized. Metal matrices could also be used but are not as preferred as non-metallic matrix materials since the non-metallic types require less of a charge to cut through to form the opening in the closure. The composite material closures can be made using a conventional processing and, if in laminate form, laminating processes as are well known in the art.

In order to assure that the shock caused by detonation of the pyrotechnic charge device does not adversely effect the electronics of a given system, testwork was performed to determine a rough order of magnitude characterization of the impact when using linear shaped charges. During this testwork, shock levels were measured ranging from 20–25 g's between a zero and 200 frequency for composite material cutting whereas levels of 300 to 500 g's were needed to cut through metal port covers. It is believed that the 20–25 g shock levels are acceptable for cutting through a composite material without being detrimental to the electronic instrumentation of a given rocket or vessel.

Testing was conducted of various core loads of linear shaped charges to cut through an alternative port cover design of a sheet of steel 50–60 mils in thickness as well a composite material closure using an epoxy matrix with graphite fibers in a dual layer laminate wherein the graphite fibers were hoop wrapped and helically wrapped in the composite material closure. Core loads ranged from 20 to 35 grains per foot of the explosive mixture. The test work showed that the composite material closure was successfully cut through using the linear shaped charges.

In the method aspect of the invention, the inventive composite material closure can be effectively used when transitioning from rocket booster operation to a ramjet operation. In a rocket-ramjet engine having the casing and insulating lining, the composite material closure is made coextensive with the lining. The rocket motor operation begins. Once the solid fuel of the rocket motor is expended, the pyrotechnic charges devices associated with the composite material closure are ignited using conventional means, the ignition cutting through the closure adjacent the charge location. Detonation of the pyrotechnic charges forms an opening in the composite material closure to allow air into the engine casing for ramjet operation.

In the inventive method, the various types of composite materials disclosed above can be utilized as well as different types and shapes of pyrotechnic charges. The configuration of the composite material closure with respect to the casing and lining can also be altered as described above.

As such, an invention has been disclosed in terms of preferred embodiments thereof which fulfills each and everyone of the objects of the present invention as set forth above and provides a port opening seal for a rocket-ramjet engine.

Of course, various changes, modifications and alterations in the teachings of the present invention may be contemplated by those skilled in the art without departing from the intended spirit and scope thereof. Accordingly, it is intended that the present invention only be limited by the terms of the appended claims.

I claim:

1. In a rocket-ramjet engine casing having at least one port opening for ramjet engine operation and an insulating lining covering an interior surface of the casing, the improvement comprising a composite material closure coextensive with the insulating lining for sealing the at least one port opening during rocket engine operation and at least one pyrotechnic charge device affixed to said composite material closure to detonate an opening in said composite material to permit ramjet operation.

2. The rocket-ramjet engine casing of claim 1 wherein the casing has a plurality of spaced apart port openings and the composite material closure is in the form of a sleeve.

3. The rocket-ramjet engine casing of claim 1 wherein the composite material further comprises a laminate of at least two different composite materials.

4. The rocket-ramjet engine of claim 1 wherein the composite material is bonded to the insulating lining by one of an adhesive or by casting of the insulating lining onto the casing.

5. The rocket-ramjet engine casing of claim 1 wherein the composite material closure extends beyond said at least one port opening and is of a lesser thickness than said insulating lining such that said insulating lining is disposed between the casing and the composite material closure.

6. The rocket-ramjet engine casing of claim 1 wherein the composite material closure is bonded to portions of the casing adjacent the at least one port opening.

7. The rocket-ramjet engine casing of claim 1 wherein the at least one pyrotechnic charge device comprises one of a linear shaped charge device, a sheet explosive charge device, a detonating core charge device and combinations thereof.

8. The rocket-ramjet engine casing of claim 7 wherein a plurality of the pyrotechnic charge devices are used.

9. The rocket-ramjet engine casing of claim 1 wherein the composite material closure includes a matrix and a reinforcing filler, the reinforcing filler being selected from the group consisting of fibers, particles, strands, braids, weaves, flakes, whiskers or combinations thereof.

10. The rocket-ramjet engine casing of claim 1 wherein the composite material closure includes a matrix and a reinforcing filler, the matrix material being selected from the group consisting of phenolic resins, epoxy resins and silicones.

11. The rocket-ramjet engine casing of claim 1 wherein the at least one pyrotechnic charge device is sized to completely separate a segment of the composite material closure to form said opening.

12. The rocket-ramjet engine casing of claim 1 wherein the at least one pyrotechnic charge device is sized such that said composite material closure forms a hinge by said detonation.

13. The rocket-ramjet engine casing of claim 1 wherein said composite material closure is shaped in the form of one of a rectangle and a square.

14. A method of transitioning from rocket engine operation to ramjet engine operation comprises the steps of:

a) providing a rocket-ramjet engine having a casing with at least one opening for ramjet operation, the casing including an insulating lining on an inner surface thereof and a composite material closure sealing the at least one opening and being coextensive with the insulating lining and including at least one pyrotechnic charge device; and b) detonating the at least one pyrotechnic charge device to form an opening in said composite material closure for ramjet engine operation.

15. The method of claim 14 wherein the composite material is a matrix having a reinforcing filler.

16. The method of claim 14 wherein said composite material closure forms a hinge structure during said detonating step.

17. The method of claim 14 wherein said detonating step removes an entire segment of the closure.

18. The method of claim 15 wherein the reinforcing filler of the composite material closure is selected from the group consisting of fibers, particles, strands, braids, weaves, flakes, whiskers or combinations thereof.

19. The method of claim 15 wherein the matrix material is selected from the group consisting of phenolic resins, epoxy resins and silicones.

20. The method of claim 14 wherein the at least one pyrotechnic charge device comprises one of a linear shaped charge device, a sheet explosive charge device, a detonating core charge device and combinations thereof.

21. The method of claim 14 wherein a plurality of the pyrotechnic charge devices are used.

* * * * *